R. D. CLEMSON.
POWER HACK SAW.
APPLICATION FILED SEPT. 3, 1920.
1,437,494.
Patented Dec. 5, 1922.
11 SHEETS—SHEET 6.
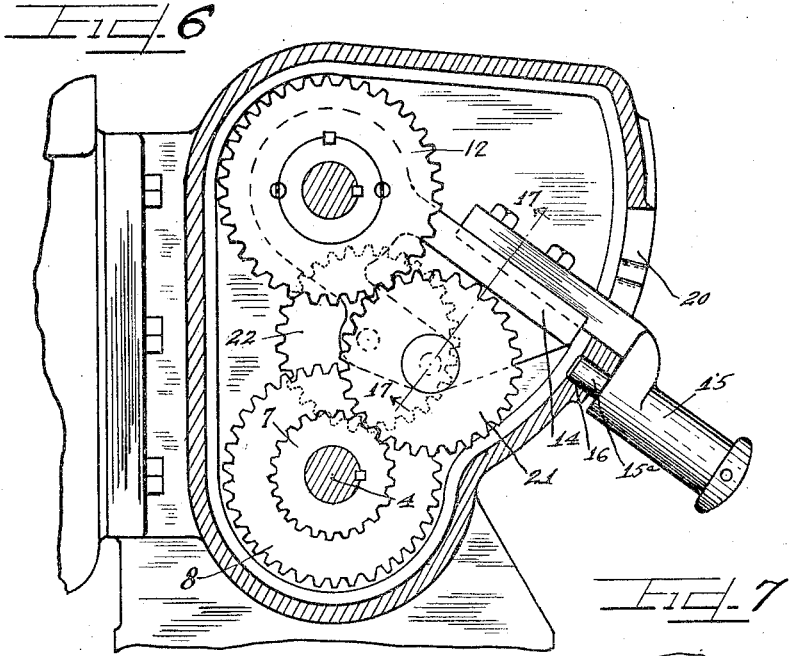
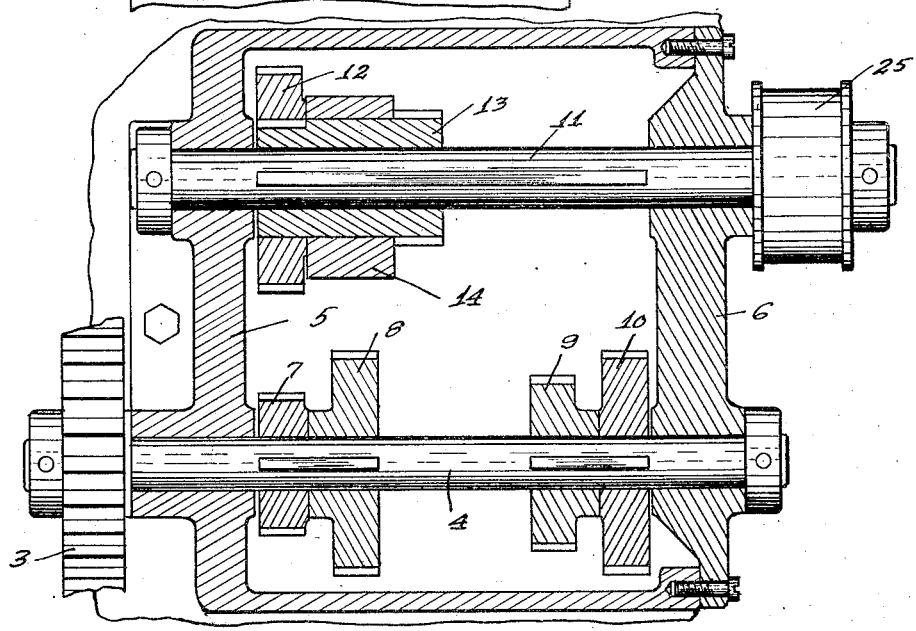

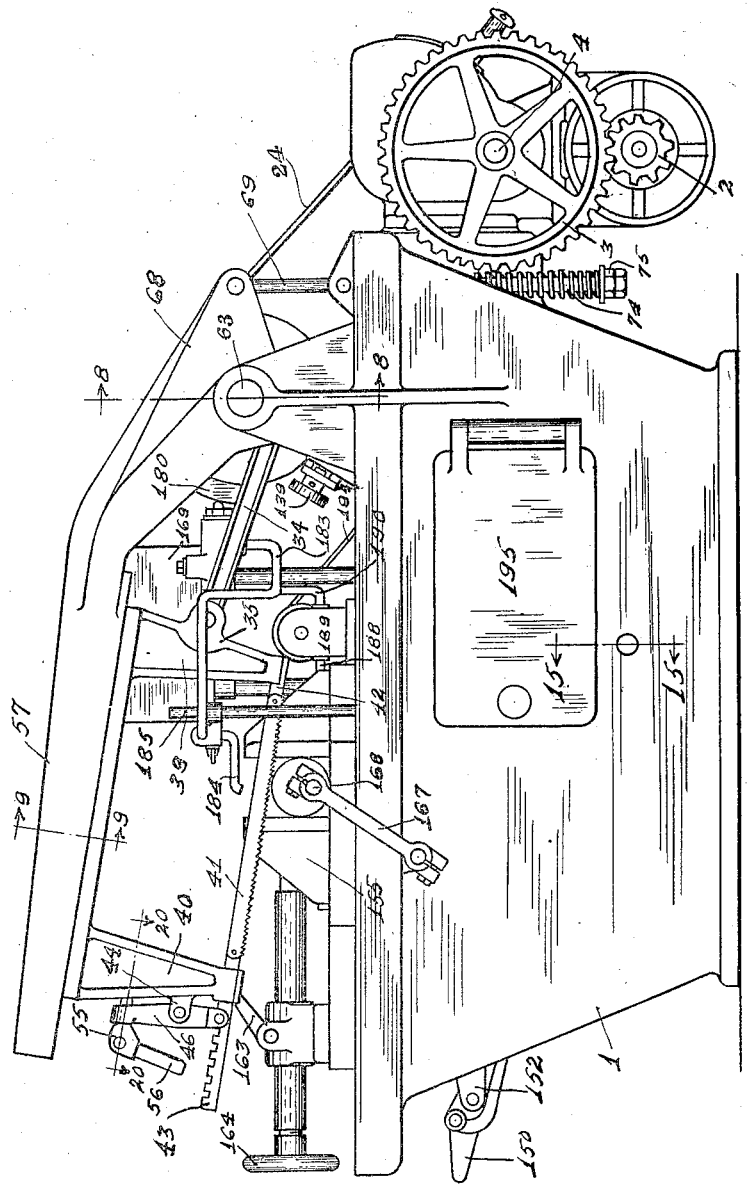

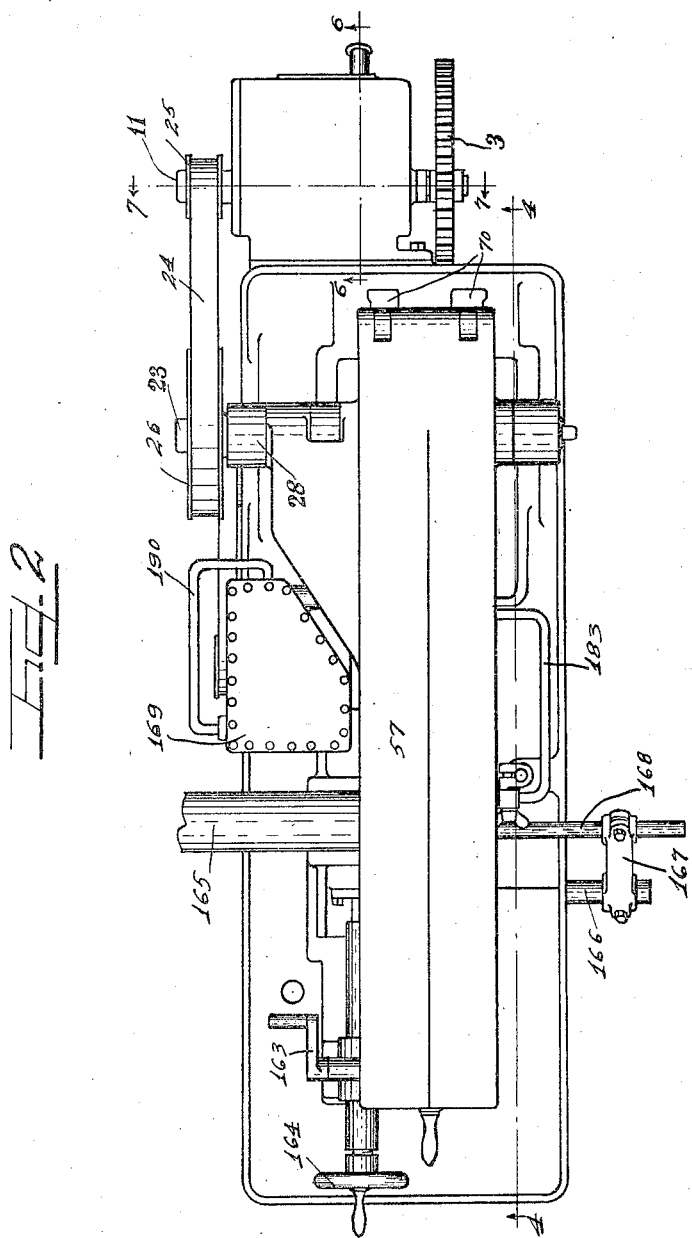

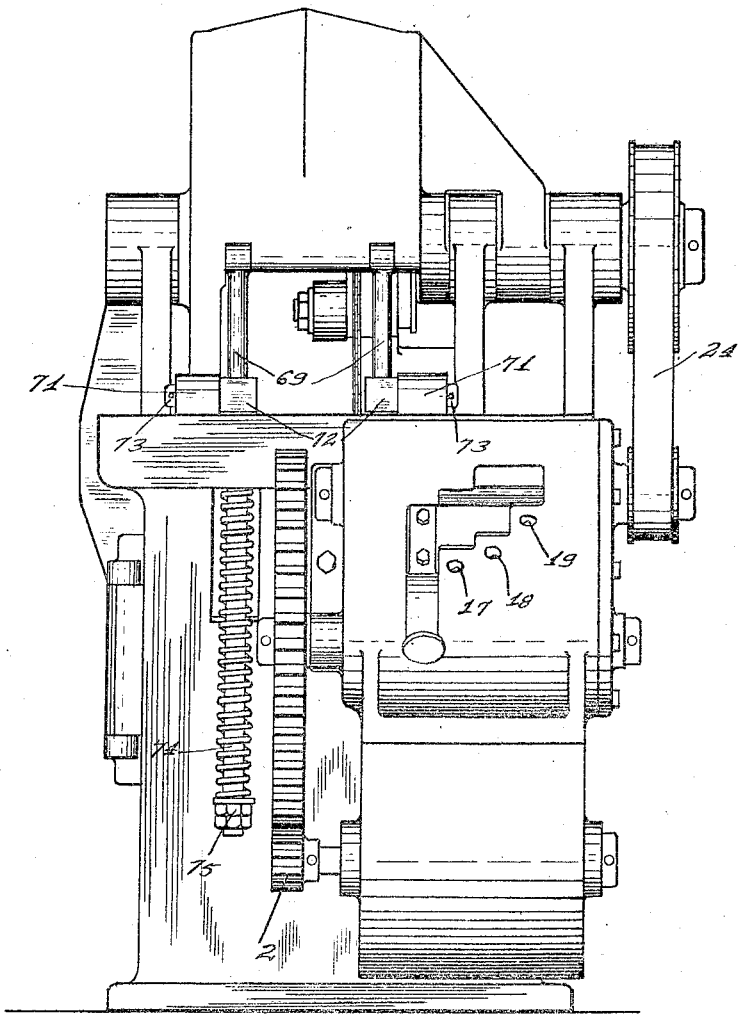

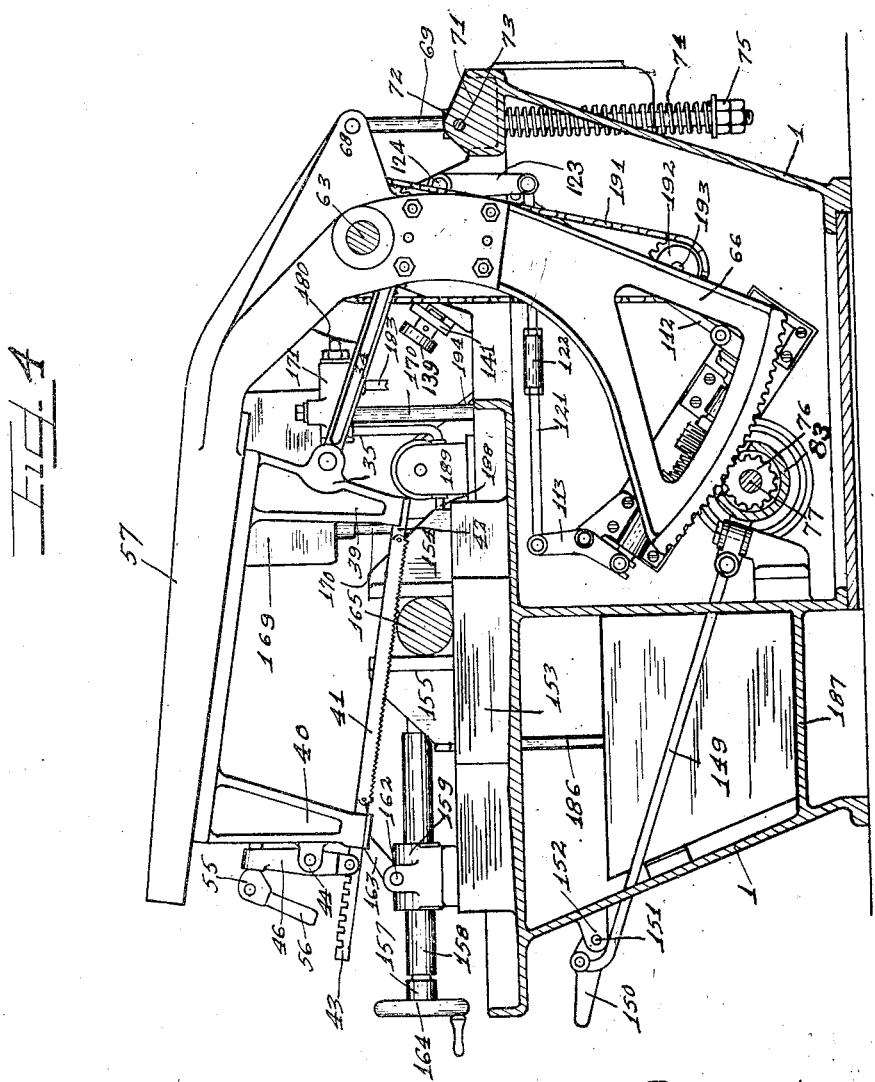

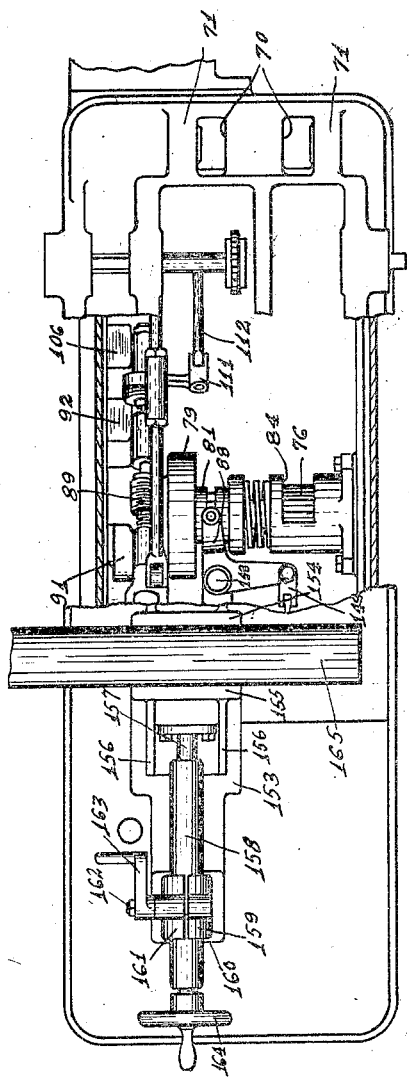

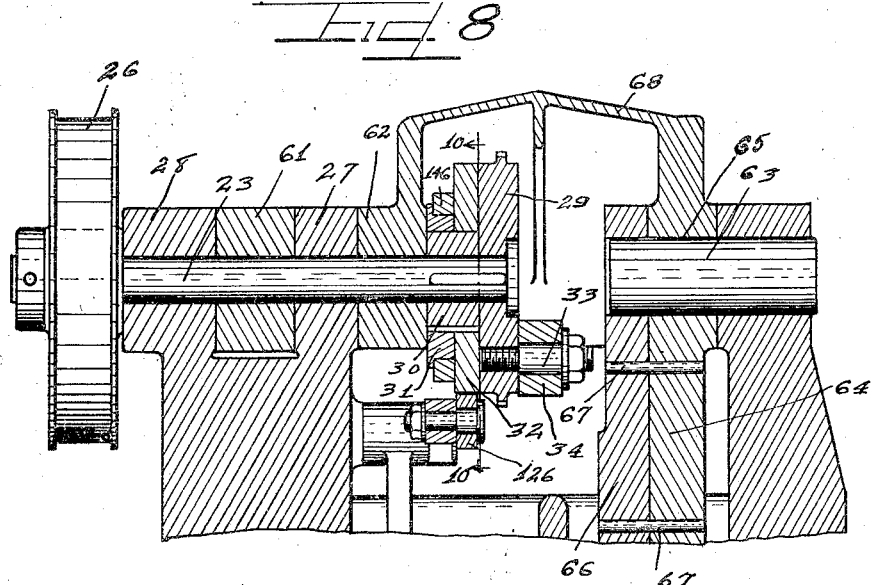
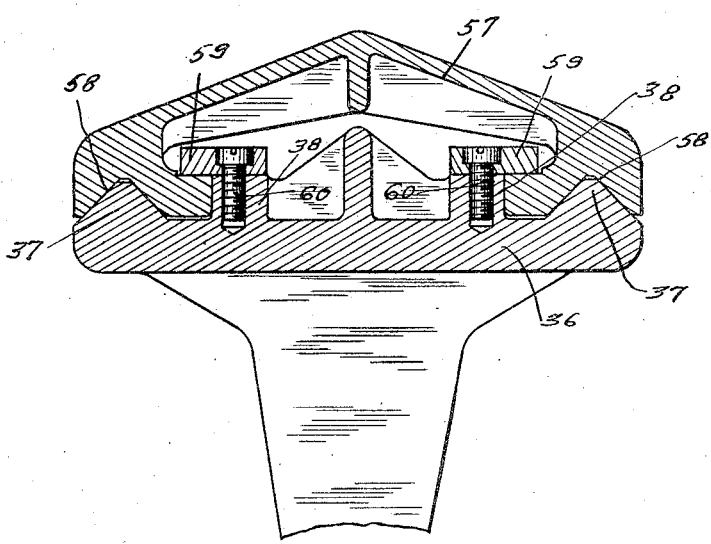

R. D. CLEMSON.
POWER HACK SAW.
APPLICATION FILED SEPT. 3, 1920.
1,437,494.
Patented Dec. 5, 1922.
11 SHEETS—SHEET 8.
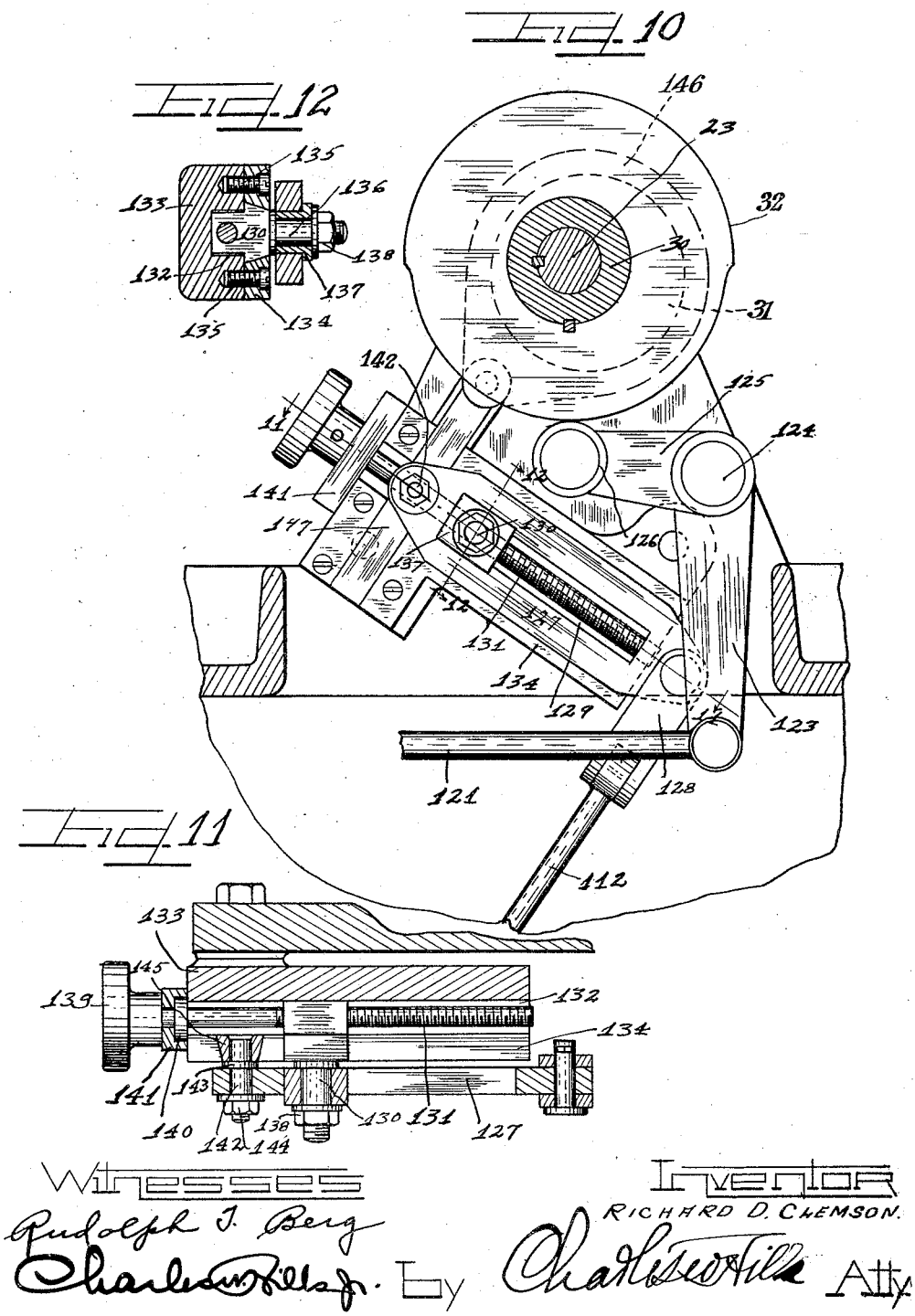

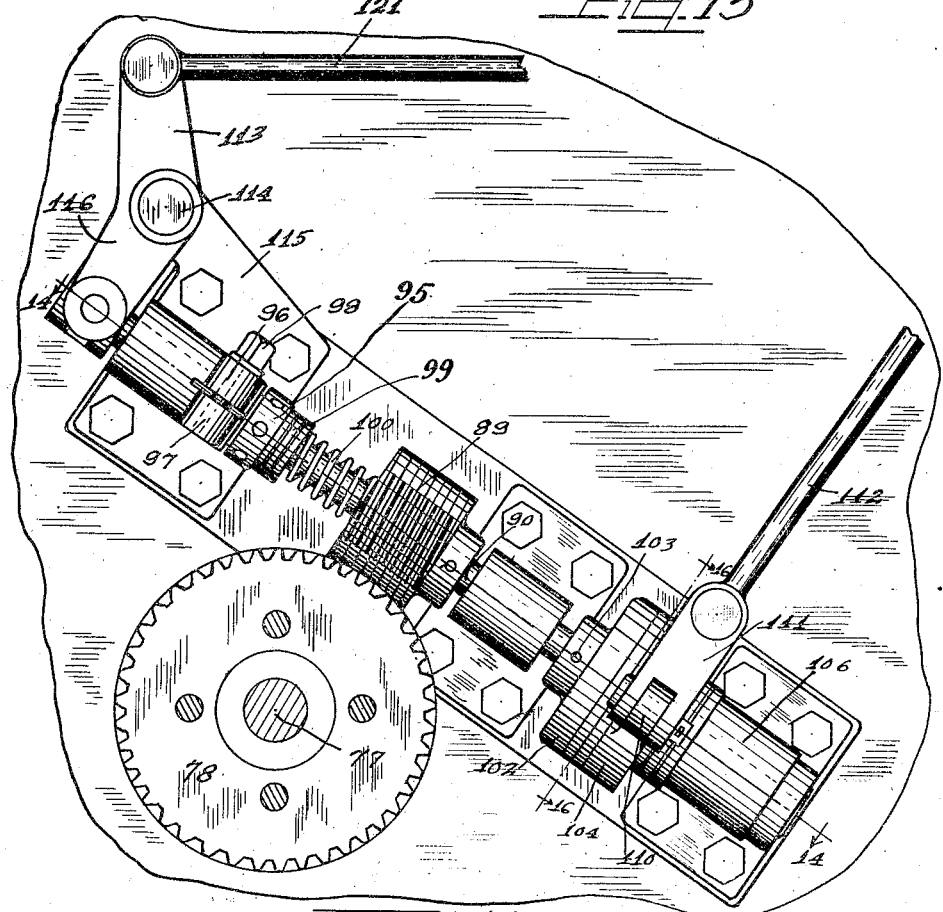

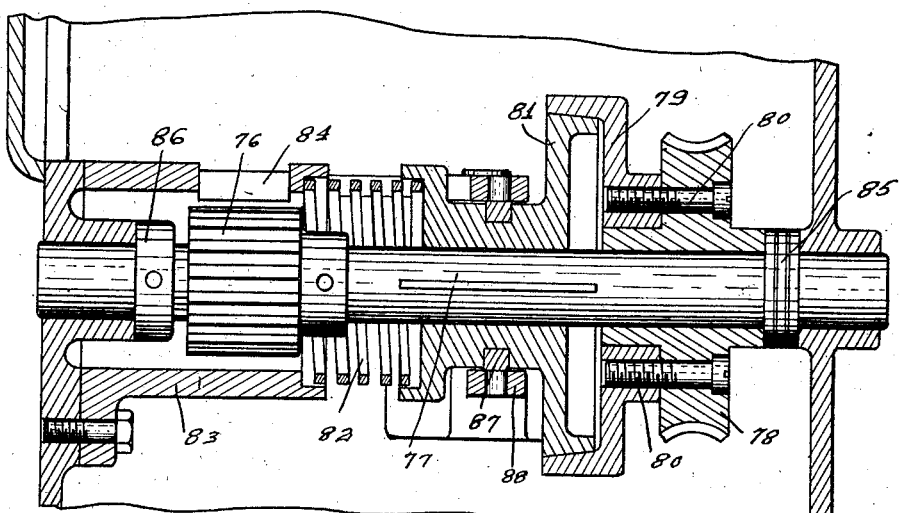
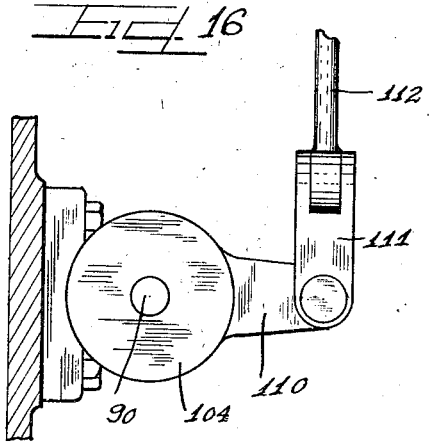
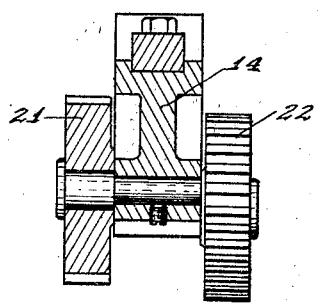

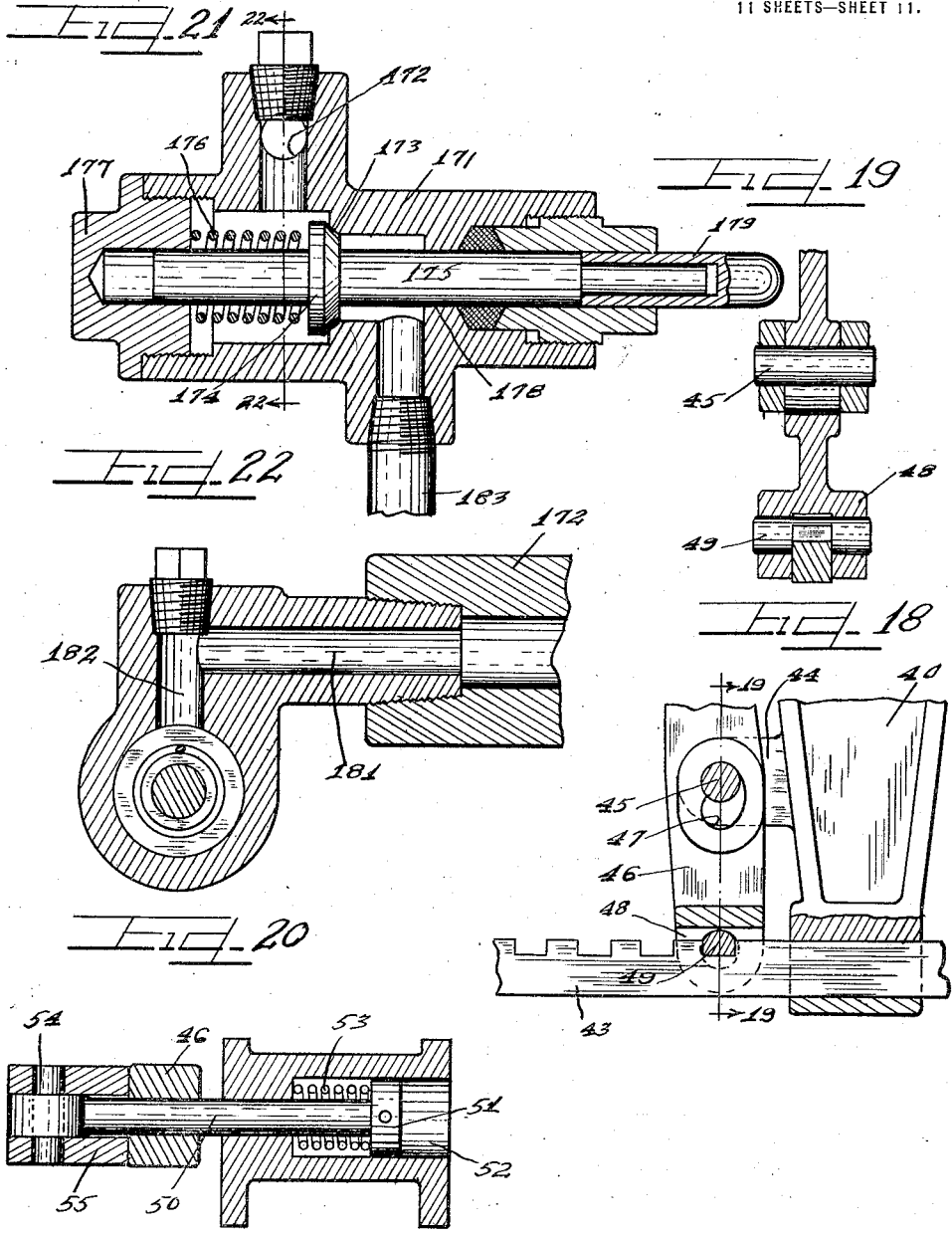

Patented Dec. 5, 1922.

1,437,494

UNITED STATES PATENT OFFICE.

RICHARD D. CLEMSON, OF MIDDLETOWN, NEW YORK, ASSIGNOR TO IDEAL WRAPPING MACHINE COMPANY, A CORPORATION OF NEW YORK.

POWER HACK SAW.

Application filed September 3, 1920. Serial No. 407,945.

*To all whom it may concern:*

Be it known that I, RICHARD D. CLEMSON, a citizen of the United States, and a resident of the city of Middletown, in the county of Orange and State of New York, have invented certain new and useful Improvements in Power Hack Saws; and I do hereby declare that the following is a full, clear, and exact description of the same, reference being had to the accompanying drawings, and to the numerals of reference marked thereon, which form a part of this specification.

My invention relates more particularly to a power driven hack saw designed to cut metal or similar solid substances.

It is an object of my invention to provide a counterbalanced feeding and guiding device for the saw.

It is also an object of my invention to provide a novel control for both the operation and feeding movements of the saw.

It is an important object of my invention to provide a lubricating system for the saw which becomes effective to supply lubricant or cooling fluid to the saw upon its initial stroke.

It is a further object of my invention to generally improve the construction and operation of the saw.

Other objects and advantages arise from the particular construction and operation as will be more specifically pointed out hereinafter.

The invention consists of the matters hereinafter described and more fully pointed out and defined in the appended claims.

On the drawings:

Figure 1 is a side elevation view of a power hack saw embodying my invention.

Figure 2 is a top plan view thereof.

Figure 3 is an end view thereof taken at the right hand end of Figure 1.

Figure 4 is a section on the line 4—4 of Figure 2.

Figure 5 is a part sectional and horizontal view through the interior of the machine.

Figure 6 is a section on the line 6—6 of Figure 2 on an enlarged scale.

Figure 7 is a section on the line 7—7 of Figure 2 on an enlarged scale.

Figure 8 is a section on the line 8—8 of Figure 1 on an enlarged scale.

Figure 9 is a section on the line 9—9 of Figure 1 on an enlarged scale.

Figure 10 is a section on line 10—10 of Figure 8 on an enlarged scale, showing the operating mechanism in plan view.

Figure 11 is a section on the line 11—11 of Figure 10.

Figure 12 is a section on the line 12—12 of Figure 10.

Figure 13 is a plan view of the feed control on an enlarged scale.

Figure 14 is a section on the line 14—14 of Figure 13 on an enlarged scale.

Figure 15 is a section on the line 15—15 of Figure 1 on an enlarged scale.

Figure 16 is a section on the line 16—16 of Figure 13.

Figure 17 is a section on the line 17—17 of Figure 6.

Figure 18 is a fragmentary view partly in section showing the outer end construction of the saw on an enlarged scale.

Figure 19 is a section on the line 19—19 of Figure 18.

Figure 20 is a section on the line 20—20 of Figure 1 on an enlarged scale.

Figure 21 is a section through a valve construction used in my spraying system shown in Figures 1 and 4, on an enlarged scale.

Figure 22 is a section on line 22—22 of Figure 21.

As shown on the drawings:

The machine is supported in a suitable frame, which may be cast integral, and comprises primarily a variable speed driving mechanism, a saw feeding and control mechanism, a hack saw which is operated by the driving mechanism and fed to its work by the feeding mechanism, the control mechanism co-operating with the feeding mechanism to control the same, and a spraying system for supplying the cutting lubricant.

The driving mechanism comprises preferably a pinion 2, which may be driven by any suitable motor. This pinion 2 drives a large gear wheel 3 mounted on a shaft 4 (see Figures 6 and 7) supported in the walls 5 and 6 of a small housing adjacent the main frame. Gears 7, 8, 9 and 10 are keyed upon shaft 4. A second shaft 11 is mounted in the same walls of the housing above the shaft 4, and a pair of gears 12 and 13 of different diameter are slidably splined upon said shaft 11, gear 12 being keyed on the hub of gear 13 and spaced therefrom to provide a space for mounting a gear supporting and shifting yoke 14 having a revolver-shaped handle 15 bolted thereto.

This handle member 15 extends through a slot 20 in the housing and is provided with a detent plunger 15a designed to fit in a series of apertures 16, 17, 18 and 19 (see Figures 3 and 6). A pair of gears 21 and 22 are rotatably supported by yoke member 14, as shown in Figure 17. In Figure 6, gear 21 is shown in mesh with gears 7 and 12. But by unlatching and raising yoke member 14, it can be shifted so that plunger 15a will enter aperture 16, the slot having a series of stepped portions for this purpose. The shifting of the yoke member 14 will aline gears 12, 21 and 8 to effect a different speed since gear 8 is larger than gear 7. By unlatching and raising yoke 14 again, it may be shifted so that the plunger 15a will engage aperture 18, thereby bringing gears 13, 22 and 9 in meshing alinement to effect a higher speed. In like manner, yoke 14 may be shifted to bring gears 13, 22 and 10 into meshing alinement for a still greater speed.

The rotation of shaft 11 through the mechanism above described imparts rotation to a driving shaft 23 (see Figure 8) through a belt 24, which is in driving relation with a pulley 25, on shaft 11, and a pulley 26 on shaft 23 (see Figure 2). Shaft 23 is journalled in bearings 27 and 28 of the frame and supports upon its inner end a sprocket wheel 29 having a hub 30 upon which are keyed an eccentric 31 and a cam 32, the sprocket being in turn keyed to the shaft. This sprocket wheel has a wrist pin 33, which rotatably supports a pitman 34 connected to a hack saw 35 (see Figure 1). Rotation of shaft 23 therefore reciprocates the hack saw.

The hack saw comprises a frame member having an upper ribbed plate 36 and having beveled longitudinal guide rails 37. Spaced a short distance from the rails 37 are a pair of vertical members 38. Saw supporting members 39 and 40 extend from each end of the plate 36, in which the saw 41 may be supported in any suitable manner. As shown, member 39 has a lower horizontal lug 42 to which one end of the saw is secured, while the member 40 has a slot in its lower end in which a toothed rod 43 slidably fits, the other end of the saw being secured to the inner end of this rod 43. Rod 43 is slidably adjustable to accommodate saws of different lengths. For this purpose a lug 44 is integral with member 40 (see Figure 18). This lug supports a journal bolt 45 for supporting a lever 46 having a fulcrum arcuate slot 47 in which said bolt rests, and a lower bifurcated end 48 adapted to receive the toothed bar 43. A detent bolt 49 spans the bifurcations and fits between the teeth on rod 43 to lock it in adjusted position. The upper end of the lever 46 is mounted upon a horizontal plunger rod 50, having a head 51 slidably mounted in a cylindrical chamber 52 in the saw supporting member 40. A spring 53 surrounds the plunger rod in the chamber and is confined between said head 51 and the end wall of the chamber. The outer end of the plunger rod 50 has a bearing pin 54 secured therein for supporting a cam member 55 having a handle 56. It will be noted that the cam bears against the lever 46 to securely hold it in adjusted position. When it is desired to put in a new saw, it is only necessary to raise lever 46, bringing thereby fulcrum pin 45 in the lower part of slot 47 where it may be held until a new saw has been inserted, after which it may be lowered and locked by cam 55 as just explained.

As the saw reciprocates in cutting metal, it is necessary that some means be employed to press the saw downwardly while it is cutting, or in other words to feed the saw to its work and at the same time guide it. For this purpose, I preferably employ a leverage or feeding device having a horizontal arm 57 having guide grooves 58 (see Figure 9), in which the guide rails 37 of the saw are adapted to fit. The inner flanges of the guide grooves 58 abut against the guide members 38 and are overlapped by plates 59 secured to said members 38 by screws 60. Thus the hack saw is slidably interlocked with the horizontal arm of the leverage or feeding device. This feeding device is rotatably supported upon one side upon shaft 23 by means of the journal lugs 61 and 62, and upon the opposite side, it is supported upon a trunnion 63 supported in the frame of the machine, the feeding device having a leg 64 in which a journal aperture 65 has been made for receiving the trunnion 63. A segmental rack member 66 is also journalled upon trunnion 63 and bolted to the leg 64 of the feeding device by means of bolts 67. It will be noted by referring to Figure 4 that the leverage or feeding device has a peculiar configuration. From the horizontal arm 57 it extends downwardly in a bowed or arched construction and that it is supported at a point in the arch below the horizontal arm 57. From the horizontal arm, extends an extension 68 and to this extension are pivoted a pair of rods 69, which depend and pass through apertures 70 in the frame (Fig. 2) and extend a considerable distance therebelow, as shown in Figure 4. Adjacent the apertures 70, the frame is provided with a pair of humps or blocks 71, which may be cast integral therewith. Upon the inner sides of these blocks, there are apertured blocks 72, which have bearing pintles 73 rotatably mounted in blocks 71. The rods 69 have a sliding fit in the blocks 72, which it will be noted form a swivel connection with blocks 71. Compression springs 74, only one of which is shown, surround the rods 69 and abut against the bottom of the blocks 71 and the nuts 75 for counterbalancing the leverage or feeding device.

This leverage or feeding device is operated and controlled by adjustable mechanism. For this purpose the feeding device contains the said segmental rack member 66, which meshes with a spur gear 76 firmly secured upon shaft 77, which is supported in the frame of the machine transversely thereof, as shown in Figure 15. This shaft 77 is operated by means of a worm gear 78 rotatably mounted upon said shaft. Said worm gear is designed to be put in operative relation with said shaft by means of a clutch which consists of an outer clutch drum member 79 secured to the worm gear by screws 80 and an inner clutch drum member 81, which is slidably splined upon said shaft and urged into operative relation with the drum member 79 by means of a spring 82, one end of which abuts against the hub of clutch member 81 and the other end of which abuts against a sleeve 83 surrounding the shaft 77 and spaced therefrom, said sleeve having an opening 84 through which the rack member 66 extends. A thrust bearing 85 may be placed between the bearing wall and the worm gear 78, while a collar 86 may be secured against the bearing at the opposite end to keep the shaft in place The clutch member 81 is provided with the usual groove 87 for supporting a yoke member 88, by which said clutch member may be shifted.

The above said worm gear 78 is operated by means of a worm 89, which is secured upon shaft 90 arranged at an oblique angle and journalled in bearing lugs 91 and 92 secured to the inner side of the rear frame (see Figures 5, 13 and 14). The journal aperture of lug 91 is enlarged at its inner end and screw-threaded for receiving an externally threaded bearing sleeve 94, having a collar 95 at its outer end, said collar being provided with holes to fit a spanner wrench whereby the sleeve may be adjusted, and a pair of clamping members 96 and 97 are secured to lug 91 on opposite sides of sleeve 94 and are designed to overlap said sleeve and clamp said sleeve against longitudinal movement by means of a screw bolt 98. A thrust bearing 99 is preferably arranged adjacent said collar 95 against which one end of a coil spring 100 abuts. The opposite end of said coil spring is housed within a recess 101 in the worm gear 89, and abuts against the inner wall of the recess. The right hand end of said shaft 90 has a clutch member 102 secured thereto by means of a pin 103. Clutch member 102 is designed to frictionally engage a clutch member 104 having a bearing sleeve 105 journaled in a bearing lug 106 secured upon the frame. A thrust bearing 107 is preferably placed between the clutch member 104 and the lug 106 and is supported upon said sleeve 105. A stub shaft 108 may extend through clutch member 104 and sleeve 105. The shaft 108 and sleeve 105 extend beyond the outer face of the lug 106, at which point a collar 109 of larger diameter than the sleeve is secured to the shaft and sleeve closely adjacent the lug 106, whereby the clutch member 104 is constrained from longitudinal movement. It should be noted that the spring 100 is designed to keep clutch member 102 in frictional engagement with clutch member 104 by shifting shaft 90 toward the right, and that the tension of said spring may be varied by adjusting the sleeve 94 by means of a spanner wrench. Clutch member 104 has an apertured lug 110 upon its periphery designed to pivotally support a link 111, to which a pitman 112 is pivoted. When this pitman is reciprocated, a limited rotational movement will be imparted to shaft 90 through the friction clutch. This rotational movement is limited to the amount required for operating the feeding mechanism at each operative stroke of the hack saw. But during each inoperative stroke of the hack saw, it is desirable that the driving relation between the clutch members 104 and 102 be broken. For this purpose means are provided for shifting shaft 90 longitudinally against the tension of the spring 100 when the hack saw begins its inoperative stroke. A part of this means comprises a bell crank lever 113 pivoted at 114 to a lug on flange 115 of bearing block 91. One leg 116 of this bell crank lever is in the form of a yoke which straddles the end of shaft 90. A pair of trunnions 117 are rotatably mounted in diametrically and oppositely arranged apertures in the arms of the yoke. The inner ends of these trunnions are designed to fit in a groove 118 formed between the collars 119 and 120 on shaft 90. The other arm of the bell crank lever is pivotally connected to an operating link 121, which is connected to the driving shaft 23 in such relation that it will be operated to shift shaft 90 to disconnect it from operative relation with clutch member 104 at the beginning of each inoperative stroke of the hack saw. The link 121 has preferably an adjustable turnbuckle 122 (see Figure 4) at a suitable place in its length whereby it may be adjusted.

The mechanism for operating the link 121 and the pitman 112 is shown to best advantage in Figure 10, in which link 121 is shown pivoted to the lower arm 123 of a bell crank lever which is pivoted to the frame by means of a journal pin 124 arranged at a suitable distance below the cam 32 previously described. The upper arm 125 of the bell crank lever has a roller 126 journalled upon its outer end in the plane of the cam 32, which is designed to contact said roller and operate said bell crank lever at the beginning of each inoperative stroke of the hack saw. The pitman 112 is operated by the eccentric 31, shown in dotted lines in Figure 10, through an adjustable lever 127 which is connected to pitman 112 by means of the link 128. The lever 127 has a longitudinal slot 129 designed to slidably receive an adjustable fulcrum 130, which is threaded upon a screw 131, which screw is secured against longitudinal movement in the longitudinal groove 132 of the support 133, the support being suitably fastened to the frame of the machine by bolts or screws. As shown in Figure 12, the fulcrum 130 has an inner rectangular portion designed to slidably fit the groove 132 and an intermediate portion representing a frustum of a rectangular pyramid which slidably fits a conical slot in plate 134 secured to support 133 by means of screws 135, the restricted portion of the frustum and groove being at the external surface whereby the fulcrum is precluded from vertical shifting movement. The outer end of the fulcrum is in the form of a journal pin 136, upon which is revolubly secured a flanged bushing 137 by means of a nut 138. The flanged bushing is shaped to fit the slot 129 of lever 127 with the flange thereof overlapping the lever to hold the same upon the bushing. This fulcrum can be adjusted longitudinally by means of the screw 131, which has a knob 139 upon its outer end for operating it, and a collar 140 spaced therefrom which is anchored between the plate 141 and the support 133 and plate 134, to prevent longitudinal movement of the screw. Above the fulcrum, the lever is provided with a pivot pin 142, which revolubly fits in an aperture in the lever, and is held therein by a collar 143 and a nut 144. The inner end of this pivot 142 is connected to one end of a link 145, which slidably fits in a groove 147 in the plate 134 and is thus constrained to move in a straight line. The opposite end of the link 145 is operatively connected with an eccentric strap 146, which is reciprocated by the eccentric 31.

It should be noted that the adjustable feeding mechanism just described makes it possible to adjust the throw of the saw feeding device the proper amount, and that the eccentric 31 is so constructed that the feed is gradual, and properly timed in relation to the cutting of the hack saw, and that the cam 32 will operate the bell crank lever to disconnect the clutch members 102 and 104 at substantially the moment the ineffective stroke of the saw begins.

There are times when it may be desirable to interrupt or stop the feeding mechanism at once. For this purpose, yoke member 88, which is in the form of a bell crank lever and pivoted at 148 (see Figure 5), is provided with an operating rod 149 pivoted thereto. This operating rod extends beyond the end frame (see Figure 4) where it is pivoted to a hand lever 150, which in turn is pivoted by a pin 151 to a lug 152 on the frame 1. By raising the hand lever 150, a sufficient pull is imparted to rod 149 to disconnect clutch member 81 from its companion clutch member 79, whereby the driving rotation with the feeding device is reversed. It should be noted that hand lever 150 may be raised sufficiently whereby it will serve to hold the clutch member 81 disengaged.

In referring now to Figures 4 and 5, it will be observed that the machine frame is provided with a platform for supporting the material to be sawed. In the present embodiment of my invention, this platform comprises a raised portion 153, upon which there is secured an immovable jaw or vise member 154, and a movable vise member 155 having inclined strengthening flanges 156 between which the end of an adjusting screw 157 is secured. This screw is threaded in a tube 158 which is clamped to a support 159 by means of the resilient clamp members 160 and 161, which have screw threaded lugs for receiving a hand operated screw 162; a handle 163 is preferably secured to said screw whereby it may be operated to tighten the clamp for binding the tubes 158 against movement. The outer end of said screw is provided with a hand wheel 164 for operating said screw to adjust the movable vise member 155. The metal rod or beam 165 to be sawed is placed between the two jaw members which in effect constitute a vise. Then by properly operating the screw 157, the rod or beam may be firmly clamped in the vise.

In order to provide for sawing the desired lengths of material, a gauge has been illustrated in Figures 1 and 2. While this gauge may take a variety of forms, I have shown a short supporting shaft 166 secured to the frame; an arm 167 is adjustably secured at one end upon this shaft, while the other end of the arm is provided with an adjustable clamp in which a gauge rod 168 may be adjustably clamped. The distance between the inner end of the rod and the saw will determine the length of the material to be sawed. The supporting shaft 166 is shown at one side of the material that is being sawed, and the arm 167 extends obliquely with reference to a vertical plane through said shaft, in order that the gauge rod 168 may be swung out of the way of the material when necessary.

During the sawing operation, it is necessary to provide some cutting fluid or lubricant which may be sprayed over the saw as it is operating. For this purpose I have provided a system which comprises a feeding reservoir and a receiving reservoir and a pump for pumping the fluid or lubricant from the receiving to the feeding reservoir. As shown in the drawings, I support a feeding reservoir 169 in any suitable manner, as by posts 170, on the frame above the plane of the operating saw so that the fluid or lubricant may flow by gravity to the cutting saw. I preferably employ a valve denoted as a whole by 171 in the line of feed. As shown in Figures 21 and 22, a pipe 172 connects the reservoir 169 with the valve 171. The valve proper comprises a beveled seat 173, against which is pressed a correspondingly beveled valve disk 174 on a longitudinally arranged valve rod 175. A coil spring 176 surrounds the rod 175, and abuts at one end against the valve seat and upon its other end against a screw threaded plug 177 in the end of the valve housing. This plug has a bore to receive the valve rod for supporting one end thereof. The rod is also supported in a bearing 178 and a stuffing box of usual construction as shown. The right hand end of the rod is reduced and provided with a thimble 179, which is adapted to be struck by a cam 180 on the feeding device when the same is feeding the saw. The cam 180 is so designed that it will strike the valve rod and open the valve so that the lubricating and cooling fluid will reach the saw at substantially the beginning of an effective stroke and the valve will be kept open during the entire feeding movement. When the valve is open, the fluid enters through the pipe 172, passes through the valve to the pipe 183 supported upon a standard 185 to the nozzle 184, from which it is sprayed upon the saw. The nozzle is of such construction that it may be clamped in place by a wing nut and unclamped and swung to one side. It should be particularly noted that my lubricating system is effective at the start of the first stroke of the saw and that at no period of operation, is it necessary for the saw to operate without being properly supplied with fluid. This is an important advance over a pumping system which supplies the fluid directly to the saw, and in which a number of strokes may occur before the pipes are filled to the point where the fluid reaches the saw, and the fine points of the saw teeth may be burned, dulled or damaged by that time.

The sprayed fluid collects upon the platform of the frame from whence it passes through a pipe 186 to a receiving reservoir 187. A pipe 188, shown in Figures 1 and 4, leads from the reservoir 187 to a pump 189, supported upon the machine platform or any convenient place. A pipe 190 leads from the pump to the rear side of the feeding reservoir, as shown in Figure 2. The pump 189 is adapted to be operated by the main driving shaft 23, which has a sprocket chain 191 trained over the sprocket wheel 29 upon said shaft. This sprocket chain is designed to drive another sprocket wheel 192 supported upon a shaft 193 mounted in the frame work of the machine. A connection from the shaft 193 to the pump 189 drives the said pump. The form of this connection is immaterial, so I have merely shown a belt 194 leading to the pump. It should be noted that the sprocket wheel 192 and the gearing for operating the feeding lever are housed in the frame and access thereto may be had through a door 195 on the front side of the machine.

The operation is as follows:

In operating my machine, it is contemplated that some source of power is available for driving the pinion 2 which imparts rotation to gear 3 and shaft 4, which in turn, through the aforedescribed variable gearing, drives shaft 11. This latter shaft drives the shaft 23 by means of the pulleys 25 and 26 and the belt 24. Shaft 23 is the main driving shaft, and through the eccentric 31 thereon, and the adjustable lever 127, pitman 112, clutch 102, 104 and shaft 90, drives worm 89, which in turn drives worm wheel 78 on shaft 77. Rotation of shaft 77 imparts a feeding movement to the feeding device 57, 66, 68 through the spur gear 76 meshing with the segmental rack 66 of the said feeding device. The saw is connected to the sprocket wheel 29, and during the effective stroke of the saw, the said eccentric will be effective to cause rotation of shaft 77 to impart a feeding movement to the said feeding device. But at the end of the effective stroke of the saw, the raised part on the cam 32 on shaft 23 will strike the arm 125 of the bell crank lever and through link 121, and bell crank 114, will slide shaft 90 longitudinally to the left to disengage the clutch 102, 104, whereby the feeding movement is stopped. But at the end of the idle stroke of the saw, the raised portion of the cam will ride off of the arm of the bell crank lever, allowing the spring 100 to bring the clutch members 102 and 104 into driving relation again to begin another feeding movement. If it is desirable at any time to increase or decrease the extent of feeding movement, this can be easily accomplished by shifting the fulcrum of lever 127 by means of screw 131, or if it is desired to vary the speed of the saw it will only be necessary to shift the yoke 14 and change the gears as previously explained. And if at any moment it should become necessary to stop the feeding movement, the lever 150 may be operated to disengage the clutch member 81 from its frictional relation with the worm gear 78. During the operation of the machine the lubricating system is also in operation since the pump is operated by the driving shaft 23 and the cam 180 on the feeding device will be effective to operate valve rod 175 to open the discharge valve to allow the fluid to escape from the reservoir 169 to the spraying nozzle, as soon as the saw blade starts to cut.

It will accordingly be observed that I have embodied in my invention a positive feed control that prevents jamming of the saw and guides the same, a yieldable counterbalance for the feeding device which tends to remove the pressure from the saw especially during its idle stroke, and maintains the same under constant tension; interlocking connection between the feeding device and saw frame which prevents side slip of the saw and maintains and guides the same in a straight line of travel, control mechanism for governing the operative relation of parts, and a circulating lubricating system for feeding a lubricating and cooling fluid to the cutting saw and controlled by the feeding device, so that the fluid can reach the saw as soon as it starts its first stroke, preventing thereby any possibility of burning, dulling, or damaging the saw.

I am aware that numerous details of construction may be varied through a wide range without departing from the principles of this invention, and I therefore do not purpose limiting the patent granted otherwise than necessitated by the prior art.

I claim as my invention:

1. In a device of the class described, the combination with a hack saw of a variable speed driving mechanism therefor, of mechanism for feeding and guiding said saw, and a lubricating system controlled by said feeding mechanism.

2. In a device of the class described, the combination with a reciprocating hack saw, a driving shaft therefor, of a guiding and feeding device therefor, means driven by said shaft for operating said feeding device during the cutting stroke of the saw, and means for stopping the feeding movement of said device at any point in its feeding movement without stopping said driving shaft.

3. In a device of the class described, the combination with a hack saw having a frame, of a pivotally mounted feeding device slidably interlocked with said frame, and means for controlling said feeding device and operating said saw.

4. In a device of the class described, the combination with a hack saw of a driving shaft operatively connected thereto, of a pivoted feeding and guiding device for the saw, and means for controlling said device through the rotation of said shaft.

5. In a device of the class described, the combination with a hack saw, of a feeding and guiding device slidably interlocked therewith, and means for operating said saw and controlling said device to cause said device to feed the saw during the cutting stroke thereof and to stop feeding during the idle stroke thereof.

6. The combination with a power hack saw, of a feeding and guiding device therefor, of a lubricating system for supplying lubricant to said saw, and a valve in said system operated by said feeding and guiding device.

7. In a power operated hack saw, a counterbalanced feeding device for the saw comprising a pivoted member having a horizontal arm adapted to interlock with said saw, and a depending arm having a segmental rack whereby said device may be operated.

8. In a device of the class described, the combination with a hack saw mounted in a frame, of a pivoted feeding device for the saw comprising a horizontal arm slidably interlocked with the frame of said saw, and a depending arm having a segmental rack driving mechanism for said saw, and clutch controlled mechanism connecting said segmental rack with said driving mechanism.

9. In a power hack saw, the combination with a cutting blade, of a feeding device therefor, a lubricating system for supplying lubricant to the cutting blade, said lubricating system having means operable by said feeding device for supplying lubricant to said cutting blade upon its initial and every stroke thereof.

10. In a power driven hack saw, a driving shaft, a reciprocating hack saw connected to said shaft, a device for feeding said saw downward upon its operative stroke, mechanism including a clutch for driving said device from said shaft, and means whereby said mechanism is unclutched at the end of the operative stroke of the saw.

11. In a power hack saw, a pivoted device adapted for feeding said saw to its work, a power shaft, gearing including a clutch driven by said power shaft for operating said device, and means for unclutching said gearing upon the inoperative stroke of the saw.

12. In a device of the class described, a reciprocating hack saw, a pivoted feeding device cooperating therewith, driving mechanism for said saw comprising a rotatable shaft, means connecting said device and rotatable shaft comprising a gear meshing with said device, and a clutch automatically controlled by said rotatable shaft for rendering inoperative said feeding device upon the inoperative stroke of said saw.

13. In a power hack saw, a power shaft, a pivoted saw feeding device, gearing including a clutch for operating said feeding device, adjustable mechanism connecting said gearing and power shaft, and means operated by said power shaft for unclutching said gearing at the end of the cutting stroke of said saw.

14. In a power hack saw, a saw feeding member having a horizontally extending saw sustaining portion and a vertically extending portion provided with a segmental rack, means for pivoting said member intermediate its ends comprising a driving shaft, spring tension means for balancing said member, a gear meshing with the segmental rack on said member, means including a clutch operated from said driving shaft for rotating said gear during the operative stroke of said saw, and means for unclutching said gear during the inoperative stroke of said saw.

15. In a power hack saw, a lubricating tank, a pipe leading from said tank to the saw, a saw feeding device, and means operable by said device for controlling the flow of fluid to said saw.

16. In a power hack saw, a saw feeding device, a lubricating system comprising a lubricant containing reservoir and a lubricant collecting tank, means for pumping lubricant from said tank to said reservoir, and means controlled by said feeding device for controlling the flow of lubricant to said saw.

17. In a power hack saw, the combination with a cutting blade, of a feeding device therefor, a lubricating system, and means operable by said feeding device for causing a flow of lubricant upon the initial stroke of said saw.

In testimony whereof I have hereunto subscribed my name in the presence of two subscribing witnesses.

RICHARD D. CLEMSON.

Witnesses:
OLIN B. FELLOWS,
CHARLES W. MOORE.